June 10, 1947.  E. BOCCHINO  2,421,922
TURNING AND FOLDING MEAT ROAST RACK
Filed Oct. 11, 1944
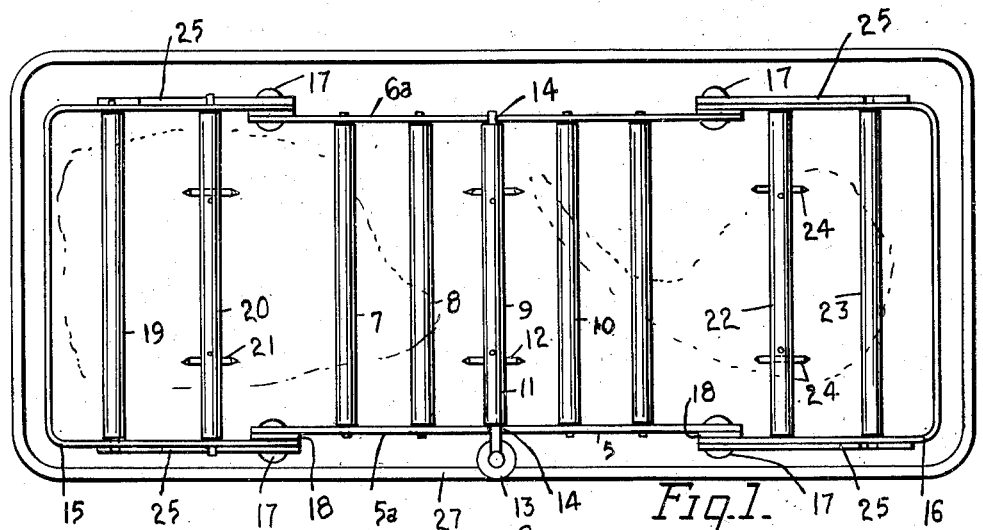
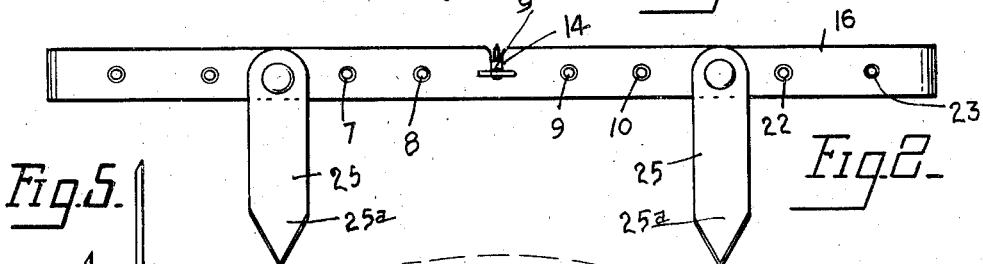
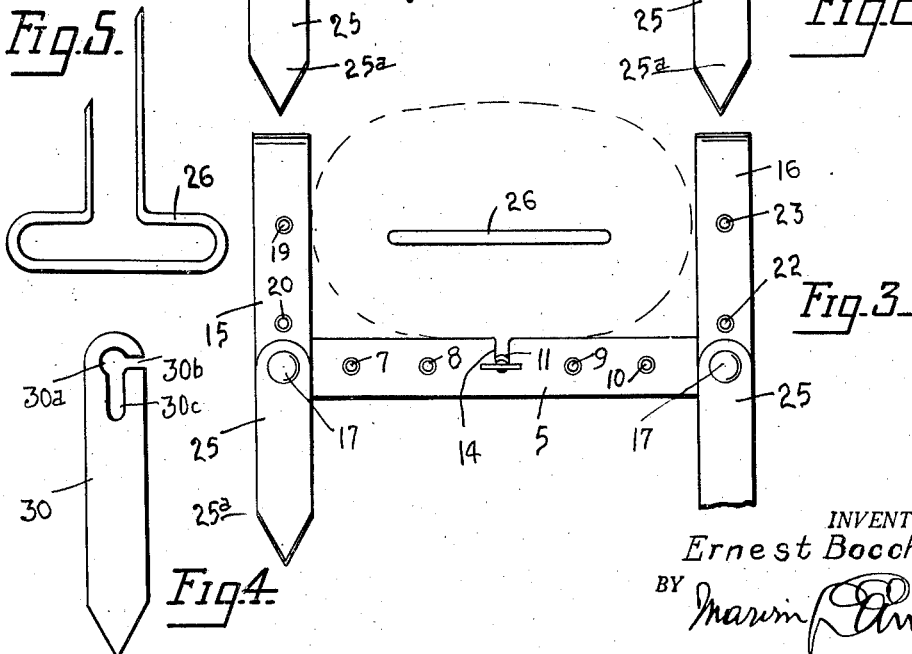
INVENTOR.
Ernest Bocchino
BY
ATTORNEY

UNITED STATES PATENT OFFICE 2,421,922

TURNING AND FOLDING MEAT ROAST RACK

Ernest Bocchino, Clifton, N. J.

Application October 11, 1944, Serial No. 558,248

3 Claims. (Cl. 99—449)

This invention relates to an improved device for holding steaks, chops and roasts to be broiled before a live fire consisting of flames, red heated electrical units, or an open outdoor fire sustained by the combustion of wood, and one of its objects is to provide a device having a main frame constructed of parts which fold upon one another, cross rollers for supporting meat or fish to be broiled, and means for shifting the position of the meat or fish upon the broiling device or frame.

Another object of the invention is to provide a device of this character which can be used for broiling meat and fish in a gas or other home oven, and which may be supported upon self contained legs to broil meat and fish over an open outdoor fire.

Another object of the invention is the provision of a device for this general purpose, having a frame consisting of a main central part, end parts which fold thereon, cross rollers for supporting the meat or fish to be broiled, and means on the rollers for piercing the surface of the meat or fish, the end folding parts being so arranged that they may be folded upwardly into approximately vertical positions and a roast placed on the central part.

With the above and other objects in view the invention consists in certain new and useful constructions, combinations and arrangements of parts, clearly described in the following specification and fully illustrated in the accompanying drawings, in which—

Fig. 1 is a plan view, showing the broiler frame fully extended and a pan disposed under it.

Fig. 2 is a side elevation thereof, the pan being removed for convenience, and the folding feet being shown extended to supporting position.

Fig. 3 is a side elevation showing the end frame members folded to upright position on the central frame member to confine a roast therebetween, the legs being shown extended to folding position, and one of the legs being shown broken away for convenience.

Fig. 4 is a detail side view of an attachable leg.

Fig. 5 is a detail side view of a turning fork.

Referring to the accompanying drawings illustrating the practical construction of the invention, 5 designates the main central frame which includes the side bars 5a and 6a, and the cross rollers 7, 8, 9 and 10, each of which is formed with end trunnions which extend through bearing holes of the side bars 5a and 6a. A central roller 11 is provided which is provided with pointed pins or barbs 12, and further provided with a flat headed key 13 on one end to permit of easy manual turning of the roller. The roller 11 is adapted to be inserted in the bearing slots 14 of the side frame bars 5a and 6a, this arrangement being such as to permit of easy withdrawal of the roller.

The side bars 5a and 6a are pivotally connected at their ends to the end U-shaped frame members 15 and 16, through the rivets 17, which are attached so that friction is maintained on the respective joints established by the engaging frame ends and the connecting rivets. Friction washers 18 are provided for these joints.

The frame member 15 is provided with rollers 19 and 20, and the latter one is provided with pointed pins or spurs 21. The frame member 16 is likewise provided with the rollers 22 and 23, and the former is provided with the pointed pins or spurs 24. All these rollers are mounted on the frame members so as to turn freely.

A leg member 25 is attached by each rivet to the pivot joint between the central frame section and the U-shaped end frame members or sections. This leg member is formed with a pointed end 25a which is designed to pierce the ground when it is desired to use the broiler frame for outdoor broiling or cooking.

The multiple broiler frame may be used as shown in Figs. 1 and 2, with all frame members or sections disposed in a horizontal plane, or used as shown in Fig. 3, with the end frame members disposed in vertical planes and the intermediate or central frame section disposed in a horizontal plane. In the former position the broiler frame can be used for broiling steaks and chops, and in the later position may be used for broiling roasts.

When the broiler frame is used for steaks, chops, fish or roasts an inexpensive fork 26, shown in Fig. 5, may be employed for turning the steaks, chops or roasts so that all surfaces will be equally exposed to the fire.

When not in use or when the device is to be carried for vacation purposes, the end frames may be folded upon the intermediate frame section, and the device neatly stored in any case or container.

The broiler frame is preferably employed with a drip pan 27, shown in plan in Fig. 1, when the fire is located above the frame, as in the case of a gas or electrically heated oven, such as homes and commercial eating houses are equipped with.

The device will be found to be extremely helpful in enabling any person, without skill, to roast or broil steaks, chops, fish, roasts and other forms of food.

In Fig. 4 I show a detachable leg 30, which is formed with an opening 30a to receive the shank of the rivet which connects the ends of the frame sections to each other, and a slot 30b which extends laterally of the opening 30a to the side of the leg, and provides means for coupling the leg to the rivet and removing it from the rivet. The leg is further formed with a longitudinal slot 30c which communicates at its outer end with the opening 30a, and this slot provides a limited adjustment of the leg on the rivet, and also serves as means for locking the leg against accidental disengagement from the rivet.

Having described my invention I claim as new:

1. A broiler frame consisting of a central frame section having side bars, rollers mounted to turn on said side bars, the side bars having opposite slots, a roller provided with lateral prongs and having trunnions insertable and adapted to turn in the slots and also provided at one end with a flat end key, a U-shaped end frame having its ends disposed in overlapping relation to the ends of the side bars, rivets connecting the overlapping ends to each other to provide friction joints between said U-shaped end frame and the side bar, a second U-shaped end frame similarly pivotally connected to the other ends of the side bars, and a leg pivotally connected by each rivet to the combined frame structure, and adapted to support the frame structure with the end frames disposed vertically on the central frame, or with the end frames disposed in the same horizontal plane as the central frame.

2. A broiler frame consisting of a central frame, end frames folding on the ends of the central frame, rollers carried by all the frames, the end frames being pivotally connected to the central frame by rivets, and a leg for each rivet having a side slot to permit the leg to be coupled on the rivet and a bearing midway of its sides communicating with said slot to receive the rivet and permit the leg to pivot thereon.

3. A broiler frame, consisting of an intermediate frame section having parallel sides, a U-shaped frame section pivotally connected to each end of the intermediate frame section, rollers mounted to turn on the intermediate frame section, rollers mounted to turn on each end frame section, each frame section having a roller provided with meat engaging lateral prongs, and folding legs pivotally connected with the ends of the intermediate section and capable of supporting the frame with the end sections disposed in endwise relation to the intermediate section or in upright relation thereto.

ERNEST BOCCHINO.

REFERENCES CITED

The following references are of record in the file of this patent:

UNITED STATES PATENTS

| Number | Name | Date |
|---|---|---|
| 1,309,049 | Syrett | July 8, 1919 |
| 77,349 | Bigelow | Apr. 28, 1868 |
| 480,693 | Foster et al. | Aug. 9, 1892 |
| 810,824 | Tobey | Jan. 23, 1906 |

FOREIGN PATENTS

| Number | Country | Date |
|---|---|---|
| 749,357 | France | May 2, 1933 |
| 26,378 | Great Britain | Nov. 21, 1896 |